(12) United States Patent
Bookbinder et al.

(10) Patent No.: US 6,733,824 B1
(45) Date of Patent: *May 11, 2004

(54) PROTECTING OPTICAL FIBER ARTICLES DURING SHIPMENT BETWEEN FACTORIES

(75) Inventors: Dana C. Bookbinder, Corning, NY (US); Gregory S. Glaesemann, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,562

(22) Filed: May 12, 2000

Related U.S. Application Data (63) Continuation-in-part of application No. 09/447,077, filed on Nov. 22, 1999.
(60) Provisional application No. 60/109,734, filed on Nov. 24, 1998.

(51) Int. Cl.[7] .............................. B05D 1/00; B05D 3/00; C03C 17/28; C03C 17/30
(52) U.S. Cl. ................... 427/154; 427/163.2; 427/165; 427/331; 65/430; 65/435
(58) Field of Search ................................ 427/154, 162, 427/163.1, 163.2, 164, 165, 331, 355; 65/385, 413, 414, 417, 421, 430, 432, 435; 385/103, 115

(56) References Cited

U.S. PATENT DOCUMENTS 4,218,294 A * 8/1980 Brack ........................ 427/154
4,243,298 A * 1/1981 Kao et al. ................... 385/128

(List continued on next page.)

FOREIGN PATENT DOCUMENTS

| DE | 2853873 | 7/1980 | |
|---|---|---|---|
| DE | 3232888 | 3/1984 | |
| EP | 0940373 | 9/1999 | |
| EP | 1050516 | 11/2000 | |
| FR | 2493302 | 5/1982 | |
| GB | 2152494 | 8/1985 | |
| JP | 55-003369 | 1/1980 | |
| JP | 57-205336 | 12/1982 | |
| JP | 58-213646 | 12/1983 | |
| JP | 62-91440 | 4/1987 | |
| JP | 02-258643 A | * 10/1990 | |
| JP | 2-258643 | 10/1990 | |
| JP | 4-65327 | 3/1992 | ......... C03B/37/016 |
| JP | 7-128558 | 5/1995 | |
| JP | 9-142864 | 6/1997 | |
| WO | WO 00/30987 | 6/2000 | |

*Primary Examiner*—Shrive P. Beck
*Assistant Examiner*—Wesley D Markham
(74) *Attorney, Agent, or Firm*—Randall S. Wayland (57) ABSTRACT

A method of manufacturing a silica-containing article used in the manufacture of an optical fiber includes the steps of applying to the silica-containing article a protective layer, and then transporting the coated article to a second factory for further processing. The layer facilitates ease of removal of particulates that deposit on the protective layer. The layer preferably ablates during, or can be readily removed subsequent to, further processing of the silica-containing article. Any intermediate product used in the manufacture of an optical fiber, for example, a core blank, core cane segment, consolidated preform, etc. may be readily shipped between various factories because the articles are protected against break-inducing particulates by the protective layer.

22 Claims, 6 Drawing Sheets

U.S. PATENT DOCUMENTS

| | | | |
|---|---|---|---|
| 4,473,599 A | 9/1984 | Elion | 427/163 |
| 4,608,276 A * | 8/1986 | Lamb et al. | 427/163.2 |
| 4,612,058 A * | 9/1986 | Geke et al. | 134/140 |
| 4,652,288 A | 3/1987 | Saito | 65/3.11 |
| 4,660,927 A | 4/1987 | Kondow et al. | 350/96.34 |
| 4,793,842 A | 12/1988 | Yokota et al. | 65/3.11 |
| 4,889,400 A | 12/1989 | Pinson | 350/96.3 |
| 4,902,323 A | 2/1990 | Miller et al. | 65/3.11 |
| 4,911,742 A | 3/1990 | Newbould et al. | 65/3.12 |
| 4,954,152 A | 9/1990 | Hsu et al. | 65/3.1 |
| 4,973,345 A | 11/1990 | France | 65/3.15 |
| 5,093,880 A | 3/1992 | Matsuda et al. | 385/100 |
| 5,309,543 A | 5/1994 | Artushenko et al. | 385/142 |
| 5,350,433 A * | 9/1994 | Baniel | 65/17.3 |
| 5,444,808 A | 8/1995 | Shackleton et al. | 385/128 |
| 5,518,516 A | 5/1996 | Garnham | 65/382 |
| 5,534,748 A * | 7/1996 | Oomen | 313/479 |
| 5,609,924 A * | 3/1997 | McCurdy et al. | 427/154 |
| 5,894,537 A | 4/1999 | Berkey et al. | 385/123 |
| 6,124,044 A * | 9/2000 | Swidler | 428/500 |
| 6,189,341 B1 | 2/2001 | Draper | 65/404 |

\* cited by examiner

PROTECTING OPTICAL FIBER ARTICLES DURING SHIPMENT BETWEEN FACTORIES

RELATED APPLICATIONS

This application is a continuation-in-part of U.S. patent application Ser. No. 09/447,077 filed Nov. 22, 1999, which claimed priority to Provisional Application 60/109,734 filed Nov. 24, 1998.

BACKGROUND OF THE INVENTION

1. Field of the Invention

The present invention relates to a method of manufacturing and protecting a silica-containing article used in the manufacture of an optical fiber. More particularly, the invention is a method of protecting the article against break-inducing particulates during shipment of the article between factories.

2. Description of the Related Art

An optical fiber is typically formed by drawing the optical fiber from a fiber preform heated to a high temperature. The fiber preform can be formed by a variety of processes. One such process, which is known as the outside vapor deposition process, is performed by applying silica-containing soot to an alumina bait rod to establish a core profile, consolidating the core profile to create a consolidated glass core blank, and drawing the core blank to a smaller diameter to create a glass core cane. The core cane is then deposited (overclad) with soot, which is consolidated to create the fiber preform. Other processes, such as modified vapor deposition (MCVD) or plasma-activated chemical vapor deposition (PCVD), known generally as inside vapor deposition processes, are performed by depositing silica on the inside of a solid glass tube. The solid glass tube with the deposit is then collapsed to form a glass core blank. Silica-containing soot is added to the outside of the core blank and consolidated to form a fiber preform. From the preform, optical fiber is drawn. Alternatively, the solid glass tube with the deposit can be collapsed to directly form a fiber preform. Still another process employed to make a preform for drawing optical fiber is the vapor axial deposition (VAD) process. The present invention has applicability in at least all of these various vapor deposition techniques.

As used herein, the term "optical fiber preform" or "consolidated preform" shall refer to an article from which a fiber can be drawn without having to add more silica-containing glass. "Core blank" and "core cane" shall be used to refer to articles that include at least part of (but not necessarily all of) the properties of the optical core of the resultant fiber. A "core cane" has been drawn from a consolidated core blank into a smaller diameter, intermediate product. Thus, in some manufacturing operations, a core cane may be formed, after which additional core and/or clad glass material may be added to the core cane to form a consolidated preform.

During drawing of an optical fiber from an optical fiber preform, the optical fiber often will break. The reduction of breaks during drawing of optical fiber is a clear goal in the industry, especially since customers now request lengths of optical fiber greater than fifty kilometers.

Figure 2:
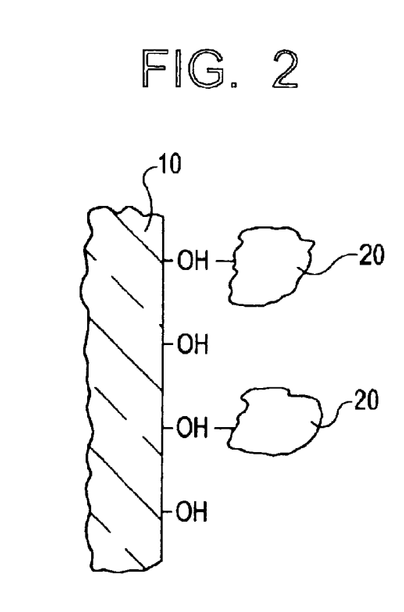
FIG. 2 shows a partial schematic, cross-sectional view of an uncoated glass surface subjected to inorganic particulates in the environment.

Fiber breaks are believed to be caused at least in part by inorganic foreign particulates (e.g., $ZrO_2$) that deposit on glass surfaces of the various articles, such as the fiber preform, core blank, core cane, and/or glass tube, produced as intermediates in the process of formation of the end-product optical fiber. These glass surfaces are reactive and can form irreversible bonds with the inorganic particulates. As shown schematically in FIG. 2, inorganic particulates 20 bond with active sites, such as OH groups, on a glass surface 10 and become part of the glass surface 10. Therefore, the particulates cannot be readily removed during standard cleaning before fiber draw. These particulates cause structural failure during fiber draw. For example, inorganic particulates on the glass surface of the fiber preform, core blank, core cane, or the glass tube, are believed to be a main cause of external fiber breaks, which occur during the draw process. Inorganic particulates on the glass surfaces of the core blank, core cane, and glass tube are believed to sometimes cause fiber internal breaks.

The inorganic particulates are present in the environment of the manufacturing plant. In addition to merely falling unaided onto the glass surfaces of the intermediate products, the particulates may be attracted to the glass surfaces by static charge. Ironically, a static charge often develops due to efforts to clean the glass surfaces.

Particulates can be removed from the glass surfaces of the intermediate products by using hydrofluoric acid as a cleaning agent. Hydrofluoric acid, however, changes the dimensions of the intermediate product because it etches the glass surface. Hydrofluoric acid is also expensive to use because it is toxic. Thus, hydrofluoric-acid cleaning is not a desirable technique for reducing fiber breaks.

It might be possible to reduce fiber breaks by manufacturing in a clean room so that there are almost no particulates to deposit on the glass surfaces of the intermediate products. This, however, would not be cost efficient.

SUMMARY OF THE INVENTION

As embodied and broadly described herein, the invention comprises a method of protecting a silica-containing article used in the manufacture of an optical fiber during shipment between factories thereby inhibiting breaks during drawing of an optical fiber. The method includes the steps of forming a silica-containing article used in the manufacture of an optical fiber at a first factory, applying a protective layer to the silica-containing article, and shipping the coated article to a second factory for further processing. The silica-containing article may be, for example, a core blank, a core cane, a fiber preform, a glass tube formed by an inside vapor deposition process, a sleeve tube used to build up a glass exterior over a core glass or rod, or any other silica-containing article used as an intermediate article in the production of optical fiber. Preferably, the silica-containing article is a glass (as opposed to unconsolidated silica soot) when the protective layer is applied.

According to one embodiment of the invention, the consolidated article has a protective layer applied thereto followed by the shipment of the intermediate article to another factory for further processing. It is an advantage of the invention that any particular intermediate, i.e., a core blank, core cane, consolidated preform, etc. may be shipped to another factory because of either a shortage in capacity or the inability to manufacture that intermediate at that particular factory. Thus, according to one embodiment of the present invention, core cane may be manufactured at a first factory, a protective layer applied, shipped to a second factory, further processed into a consolidated preform and then drawn into an optical fiber. According to another embodiment, the article may be stored at room temperature, in inventory, until production needs dictate.

In another embodiment of the invention, the consolidated preform may be manufactured at a first factory, a protective layer applied, transported to a second factory and then drawn into optical fiber at the second factory. Preferably, the preform article is cleaned prior to draw to remove any particulate(s) that may be adhered to the coating. The present invention advantageously allows certain factories to specialize in production of certain articles, e.g. core blanks, core cane, consolidated preforms or combinations thereof with subsequent application of the protective layer and subsequent shipment to the next factory. This may lead to enhanced economies and/or quality. Moreover, the present invention allows for cold transfers of consolidated preforms between factories yet with break rates comparable to, or even better than hot transfers (e.g., where the temperature of article is maintained at greater than about 600° C.).

In a preferred embodiment, the thickness of the protective layer applied, upon curing or drying, is less than 10 $\mu$m, more preferably less than 5 $\mu$m, and most preferably less than 1 $\mu$m. The layer is preferably an ultra-thin and non-peelable layer, which may be readily washed or cleaned. In one preferred embodiment, after being washed, the layer is preferably ablated prior to, or during, further processing. It is to be understood that the foregoing general description and the following detailed description are exemplary and explanatory only and are not restrictive of the invention as claimed.

BRIEF DESCRIPTION OF THE DRAWINGS

The accompanying drawings, which are hereby incorporated by reference, illustrate an embodiment of the invention and together with the description serve to explain the principles of the invention.

DETAILED DESCRIPTION OF THE PREFERRED EMBODIMENTS

Reference will now be made in detail to the presently preferred embodiments of the invention.

It has been determined that fiber breaks during the drawing of optical fiber can be reduced by applying a protective layer to various silica-containing intermediate articles which are made during the course of manufacturing an optical fiber. For example, such a protective layer can be applied to a surface of a silica-containing optical fiber preform from which the optical fiber is drawn. Preferably, the silica-containing article is a consolidated silicate-based glass article such as an optical fiber preform or other consolidated glass intermediate article for use in making an optical fiber preform, such as a core blank, core cane or silica tube. In the case where the silica-containing glass article is a consolidated preform, the preform is typically comprised of a core region consisting of silica doped with an index of refraction altering dopant, such as germania or fluorine, and the core is surrounded by a cladding which typically consists of silica or fluorine doped silica.

The protective layer protects the silica-containing article from break-inducing particulates, such as inorganic particulates, and facilitates removal of those particulates prior to drawing of the optical fiber or further processing of the article. The further processing may take place within a first factory such as A, or, optionally, at a second factory B, C or D some distance away (see FIG. 13), for example. Optionally, the further processing may comprise, for example, a different production operation within the same factory. In a preferred embodiment, the protective layer preferably ablates, essentially leaving no residue, during drawing of the optical fiber or further processing, so that it does not affect the optical properties of the optical fiber. Preferably, prior to the ablation of the protective layer, the layer is washed to substantially remove any particulates adhering to the layer. Alternatively, the layer may be substantially entirely removed before further processing.

Figure 3:
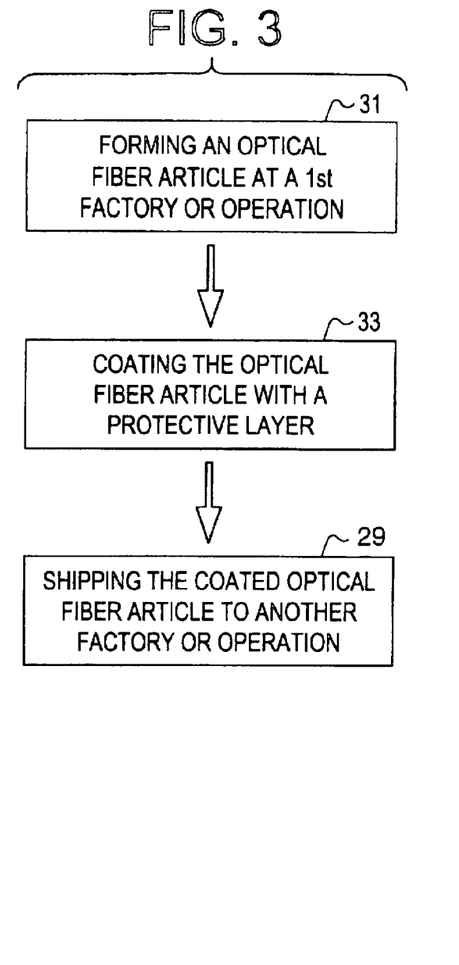
FIG. 3 shows a flow chart illustrating process steps in accordance with the invention.

The protective layer is preferably applied to any glass surface that will see an atmosphere in which it might be exposed to inorganic particulates. The protective layer is preferably applied to a consolidated or sintered glass surface, as opposed to unconsolidated glass soot. In accordance with one aspect of the invention, the layer is applied to the article at a first factory as described in FIG. 3. The layer is applied before shipment to protect the article from contamination during handling and shipping to a second factory. In particular, the optical fiber article is formed at a first factory as indicated in block labeled 31. The article may be a core blank, core cane, consolidated preform, consolidated silica-containing tube or other like intermediary high-purity glass article used to manufacture optical fiber.

Figure 13:
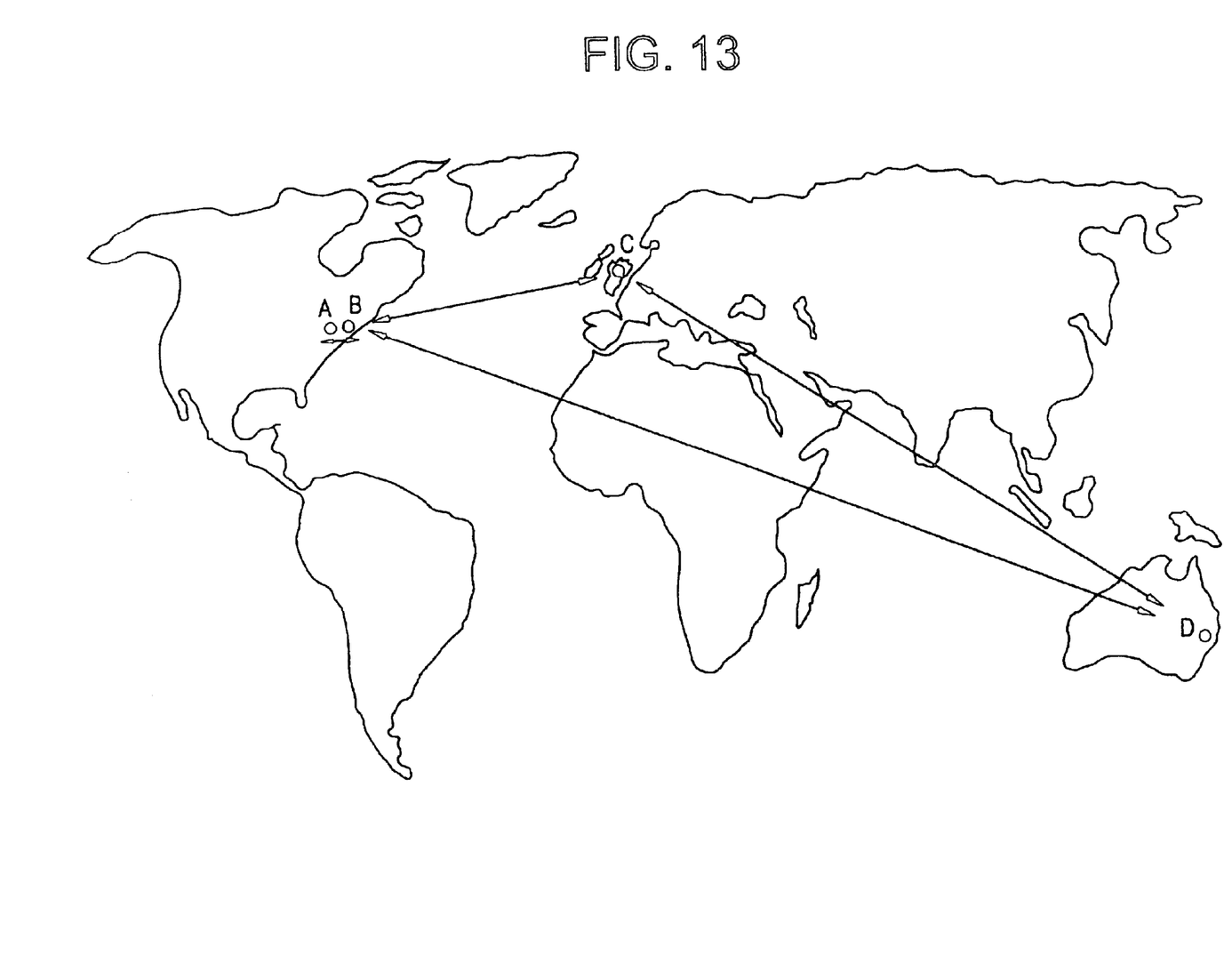
FIG. 13 illustrates shipment of coated consolidated articles between various factories in accordance with the invention.

In accordance with a first embodiment, the article is coated with a protective layer, preferably by wiping on the layer, in block 33 as hereinafter described herein and then shipped as indicated in block 29 by any appropriate shipping means to the second factory. Typical means of shipment include any commercial or private freight courier, parcel service or other transport service. By the term "second factory" as used herein, what is meant is a separate factory located at a different location within the particular country or out of the country. For example, as shown in FIG. 13, various articles including the protective layer may be shipped between any two or more of the various factories labeled as A, B, C or D depending upon the particular capacity, production needs, and function of the particular factory.

In one embodiment hereof, the protective layer can be applied to the fiber preform after the consolidated optical fiber preform is formed. The number of particulates that deposit on the optical fiber preform can be minimized by applying the protective layer to the fiber preform as soon as possible after it is formed. Just before drawing the optical fiber from the fiber preform, these break-inducing particulates can be removed (cleaned) from the protective layer on the fiber preform by, for example, wiping them off with a conventional clean room wipe containing isopropyl alcohol, blowing them off with super critical $CO_2$, or rinsing them off with a liquid such as water, or any other cleaning method suitable for removing the particulates. Thus, the particulates will not be present on the fiber preform during drawing of an optical fiber and, therefore, will not constitute break sources in the optical fiber. Following the removal of the particulates, the layer is ablated upon encountering the heat within the draw furnace. Alternatively, the layer may be substantially entirely removed prior to insertion in the furnace by cleaning with the appropriate solvent.

Figure 1:
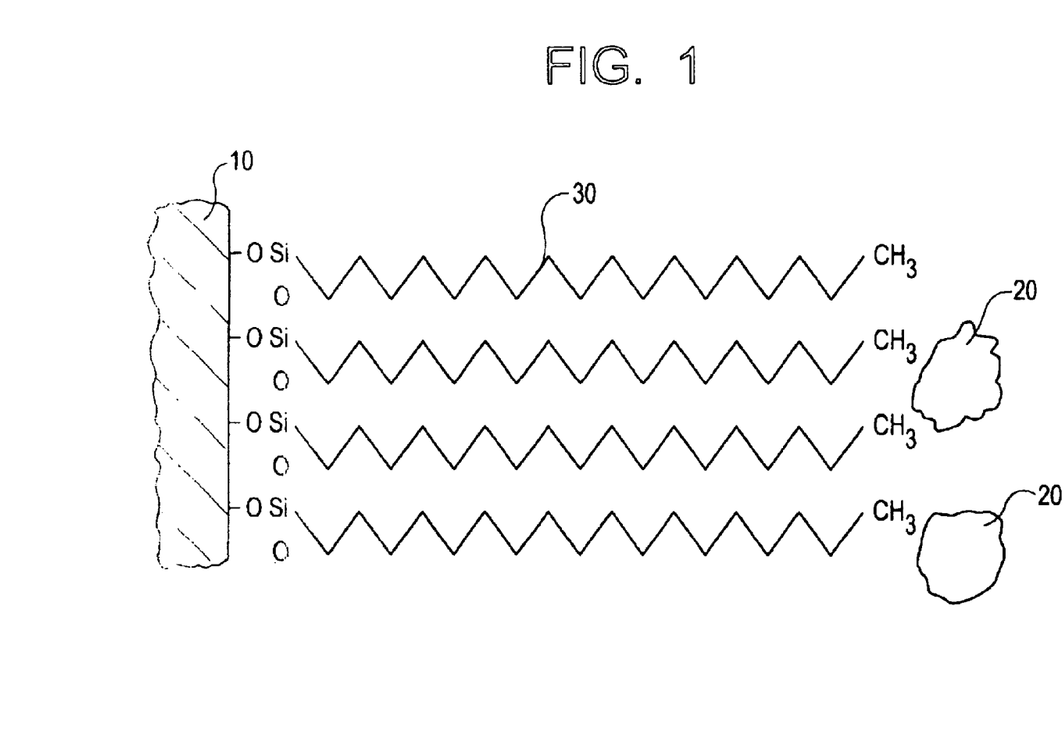
FIG. 1 shows a partial schematic, cross-sectional view of a glass surface coated with a preferred protective layer according to an embodiment of the present invention.

The protective layer preferably facilitates ease of removal of the particulates by preventing bonding of the particulates to the glass surface of the fiber preform or other intermediate article. In particular, it is believed that the protective layer preferably bonds to active sites on the glass surface due to, for example, a covalent bond, an ionic bond, or a bond due to van der Waal forces. As shown in FIG. 1, since a protective layer 30 bonds to active sites on a glass surface 10, inorganic particulates 20 merely rest on the protective layer 30 and do not bond to those active sites. The active sites can include, for example, groups that will form a $SiMO_x$ compound, where M is a metal. Examples of groups that will form such a $SiMO_x$ compound include OH, SiOH, and GeOH groups.

The protective layer preferably can be at least partially removed, and is preferably substantially entirely removed, from the fiber preform before fiber draw. For example, the protective layer can be made in the form of a water soluble polymer such as polyvinyl alcohol or hydroxymethylcellulose, which can be removed from the fiber preform by washing the fiber preform with water or another suitable solvent which removes the protective layer.

As mentioned above, in one embodiment, the protective layer ablates during the process of heating the preform such that optical fiber may be drawn therefrom. Consequently, in this embodiment, there is no need to remove the protective layer before inserting the preform into the draw furnace. The protective layer should burn off early enough in the drawing process that it does not become an integral part of the optical fiber. The temperature of the furnace during drawing is typically about 1400° C. to 2000° C. The protective layer preferably ablates below 900° C. and, more preferably, below about 500° C. (most polymer should burn off below 500° C., but carbon will burn off between 600° C.–900° C.). Preferably, the layer is cleaned just prior to insertion into, and ablation in the furnace.

The protective layer preferably leaves essentially no detrimental inorganic residue after ablating. As used herein, the term detrimental inorganic residue refers to any residue that will act as a break source. Such inorganic residue will often not dissolve into the glass and instead forms part of the glass structure. It is further preferred that the protective layer does not leave an organic residue or any carbon containing species.

It is also preferred that the protective layer prevents the build up of static on the fiber preform. This prevents particulates from being attracted to the fiber preform.

Many materials will provide a protective layer that satisfies the above-stated desirable criteria of facilitating removal of inorganic particulates and ablating during drawing of an optical fiber. Many of these materials also provide the additional desirable characteristics stated above.

For example, many organic materials satisfy the preferred criteria stated above for the protective layer. In particular, organic materials that form a self-assembled monolayer on the silica-containing article are presently preferred. Organic materials of this type preferably have a hydrocarbon or fluorocarbon functionality and include silanes, such as silane monomers or oligomers. Examples include hydrocarbon silanes, fluorocarbon silanes, epoxy functional silanes, acrylate functional silanes, amine functional silanes, thiol functional silanes, phenyl functional silanes, and any combination of the above. Hydrocarbon silane. (e.g., $C_{18}H_{37}$—Si$(OR)_3$) and fluorocarbon silane (e.g., $C_{3-10}F_n$—$CH_2CH_2$—Si$(OR)_3$) are specific examples of organic materials that each meet the preferred requirements stated above.

Other examples of organic protective layers include alkyl and aryl ammonium compounds, e.g. $C_{18}H_{37}N(CH_3)_3Cl$ or $C_{17}H_{35}CO_2Na$. The former is presently preferred when the glass is negatively charged, whereas the latter is preferred when the glass is positively charged.

Waxes such as ethylenebissteramide may provide suitable protection, for example.

Other organic protective layers can bond to the glass via Van der Waal forces. Such examples include acrylate polymers and polyvinyl alcohol.

Organic material can be applied to the fiber preform by, for example, mixing the organic material with deionized water or another suitable solvent such as isoproponal or acetone for the organic material and spraying or wiping the solution onto the fiber preform or dipping the fiber preform into the solution. Preferably, the solution contains 0.01% to 2% of the organic material.

Certain polymers will also satisfy the criteria stated above for the protective layer. Such polymers include water soluble polymers such as polyvinyl alcohol or hydroxymethyl cellulose; thermoplastic polymers such as polybutylmethacrylate; latex based polymers such as crosslinked polybutylmethacrylate latex dispersion in water; thermoset polymers such as epoxy or urethane; UV curable polymers such as acrylates and epoxies.

These polymers can be applied by various technologies such as, first dissolving the polymers or monomers in water, as in the case of polyvinylalcohol or hydroxy methylcellulose; or in a suitable organic solvent, such as acetone in the case of polybutylmethacrylate; or by applying the epoxy, urethane or acrylate monomers or oligomers to the glass surface and subsequently curing these materials via heat or UV light.

Additionally, carbon will satisfy the criteria stated above for the protective layer, particularly for the fiber preform. Carbon can be applied to the fiber preform by conventional techniques, such as vapor deposition. For example, methane, acetylene, or other carbon compounds can be decomposed by heating in an inert atmosphere to cause carbon to deposit on the glass surface of the fiber preform.

According to a preferred embodiment of the invention, the protective layer exhibits a thickness of less than 10 μm, more preferably less than 5 μm, and most preferably less than 1 μm. Most preferably, the layer is so thin that it is non-peelable.

The following example illustrates an advantage of the invention.

EXAMPLE 1

A C18-hydrocarbon silane (HC-silane) protective layer coating (DuPont, TLF-8291) was prepared as 1% solution in water. Several fiber preforms were coated, then allowed to stand in a plant environment for several hours. The fiber preforms were then wiped with a clean room cloth containing isopropyl alcohol just before being drawn into optical fiber.

The cloth containing isopropyl alcohol only removed the dirt that attached to the protective layer during exposure to the plant atmosphere. The cloth containing isopropyl alcohol did not remove the silane protective layer. Instead, the silane layer ablated during the early phases of fiber draw process due to the high temperatures employed. TOF—SIMS analysis performed on the fiber indicated no residual silane left on the drawn fiber product, and no deleterious effects were seen on the properties of the fiber due to using this protective coating process. On the other hand, using the protective silane coatings described above, break rates were significantly reduced compared to break rates normally expected with this type of fiber, especially when compared to cold transfers without the protective layer.

For ease of explanation, the present invention has been described with reference to providing a protective layer on a fiber preform to form an intermediate product protected against break-inducing particulates. A protective layer, however, can also be provided on other silica-containing articles used in the manufacture of optical fibers, to form intermediate products protected against break-inducing particulates. For example, the silica-containing article could be a core cane segment or a core blank used in an outside vapor deposition process. As an additional example, the silica-containing article could be a glass tube used in an inside vapor deposition process.

In each of these instances, the protective layer is preferably applied to a consolidated or sintered (as opposed to soot) glass surface on the silica-containing intermediate article, in an amount sufficient to provide a preferably thin coating which is sufficiently continuous that it protects the article against particulates which would otherwise become potential sources of fiber breaks during the fiber draw process. The term "intermediate article" as used herein means any intermediate article which is used to manufacture optical fiber up to and including any article from which fiber is drawn, but not the fiber itself. These protective layers are preferably at least applied onto areas that are critical to preventing breaks caused by foreign particulates. An example of such a critical area is the area on a core cane onto which additional core or clad glass or glass soot is to be added. By employing a protective layer which completely or substantially covers at least the critical areas of the silica containing article, breaks due to inorganic particulates coming in contact with the silica-containing article can be reduced substantially. The protective layer can be removed from these additional intermediate products via techniques similar to those set forth above for the fiber preform, e.g., they may be removed partially or completely prior to further processing using a solvent.

Figure 5:
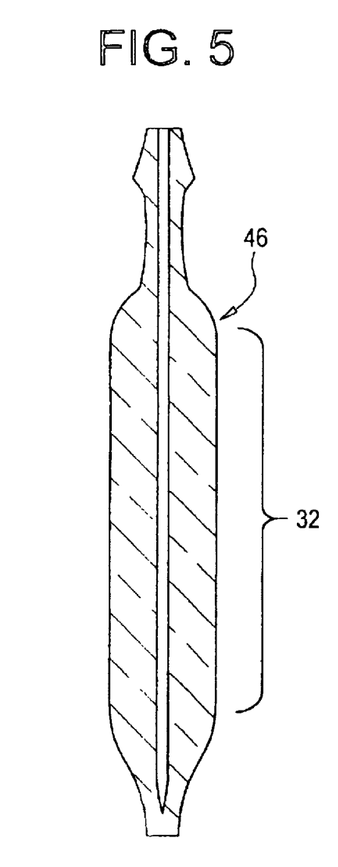
FIG. 5 illustrates a cross-sectioned view of a core blank article in accordance with the invention.
Figure 6:
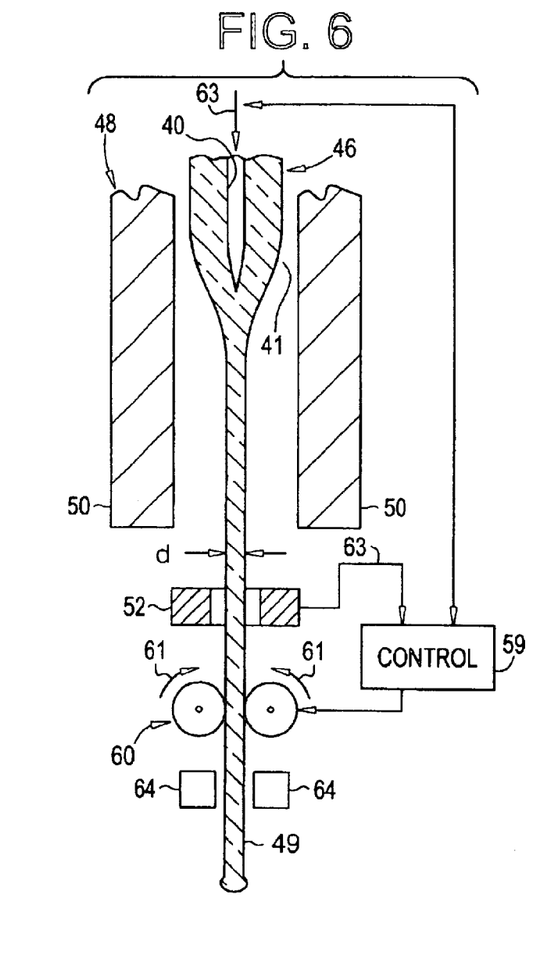
FIG. 6 illustrates a partial cross-sectioned view of an apparatus for producing core cane segments in accordance with the invention.

Further processing, for example, may include allowing the consolidated article, for example the core blank 46 as illustrated in FIG. 5, to be cooled to at or near room temperature, applying the coating to the surface 32 of the article, and then transferring the article (e.g., the core blank) to another department, unit or location within a first factory (e.g., factory A—See FIG. 13) for a second production operation or to a second factory (for example, factory B) where further operational processes are performed on the article 46. For example, if the article is a core blank 46, it may be transferred to a redraw furnace 48, as shown in FIG. 6 where it is drawn into a substantially continuous core cane 49. The redraw furnace 48 may be located at a different portion of the first factory A or at another factory B, C or D (FIG. 13), for example. Notably, the positions and number of the factories show are merely illustrative. The numbers of factories and their locations may be anywhere that business or manufacturing considerations dictate. Thus, in one contemplated embodiment in accordance with the invention, the consolidated article is a core blank 46 that may be shipped to another factory B, C, or D to drawn into core cane 49.

Figure 7:
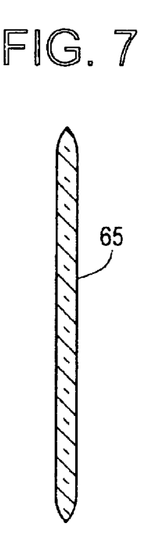
FIG. 7 illustrates a cross-sectioned view of a core cane segment in accordance with the invention.

For a germania doped silica draw blank 46, for example, the redraw furnace 48 typically includes a hot zone 41 having a temperature range between about 1800° C. and 2100° C. As the blank 46 is lowered into the hot zone 41, a strand of molten glass drops from the preform 46 and passes through a cooling section 50. A vacuum is applied to the top end (not shown) of the preform 46 to aid in closure of the aperture 40. Non-contact measurement device 52 positioned below the furnace 48 measures the diameter "d" of the continuous cane 49 exiting from the redraw furnace 48. The continuous cane 49 is fed through a set of tractor wheels 60 that provide suitable tension force to draw the appropriate diameter "d" of continuous cane 49. An appropriate control 59 may, for example, control the down feed rate (as indicated by arrow 63), the draw speed (indicated by arrows 61) of tractor wheels 60 or other parameters, for example. Input to the control 59 is preferably the diameter of the continuous cane 49 based upon the data supplied by non-contact sensor 52 in line 63. Optionally, other inputs may also be provided. Upon a predetermined length of continuous cane 49 passing through the tractor wheels, a cutter 64, such as a flame torch, is activated and cuts the continuous cane 49 to form predefined-length, core cane segments 65 as best illustrated in FIG. 7 and block 34 of FIG. 4.

Figure 4:
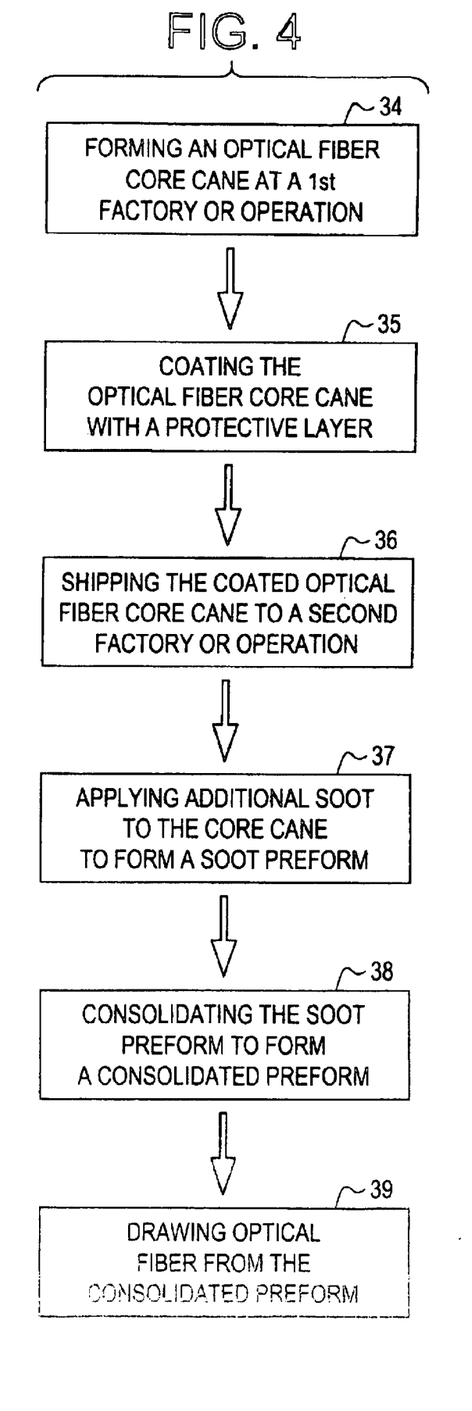
FIG. 4 shows a flow chart illustrating detailed process steps in accordance with one embodiment of the invention.
Figure 12:
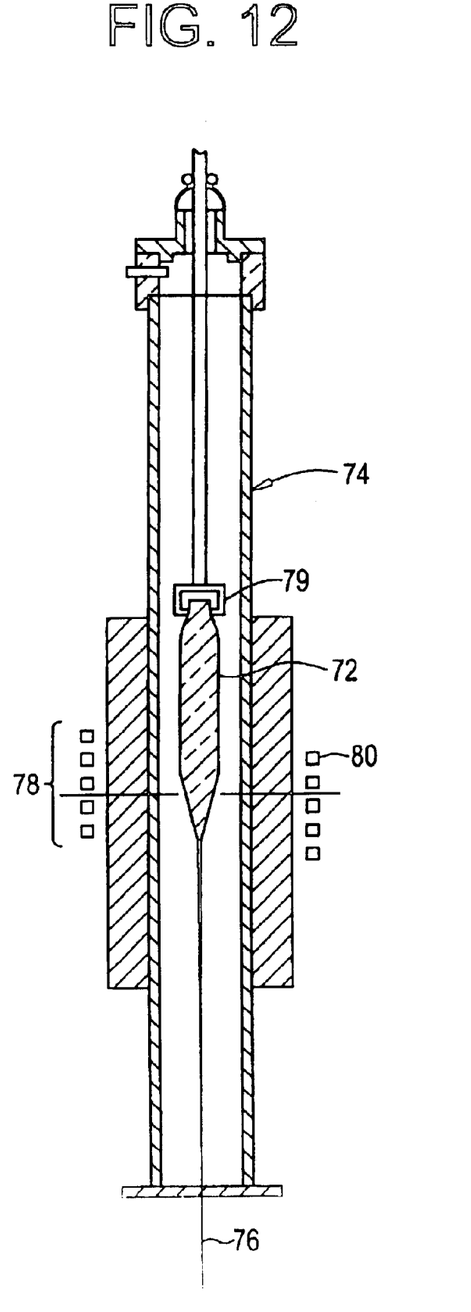
FIG. 12 illustrates a partial cross-sectioned view of a portion of a fiber draw apparatus in accordance with the invention.

Before transfer to the next operational step within the production process, whether that occurs within the same factory or at a different factory (as illustrated in FIGS. 4, 12 and 13), the core cane segment 65 is preferably provided with the protective layer in block 35 as herein-above described. In the case of the next manufacturing operation taking place at another factory (such as B, C or D), the coated core cane 65 is shipped via any practical shipment means to a second factory as indicated in block 36. Examples of shipment means include courier, parcel or other transport services.

Figure 8:
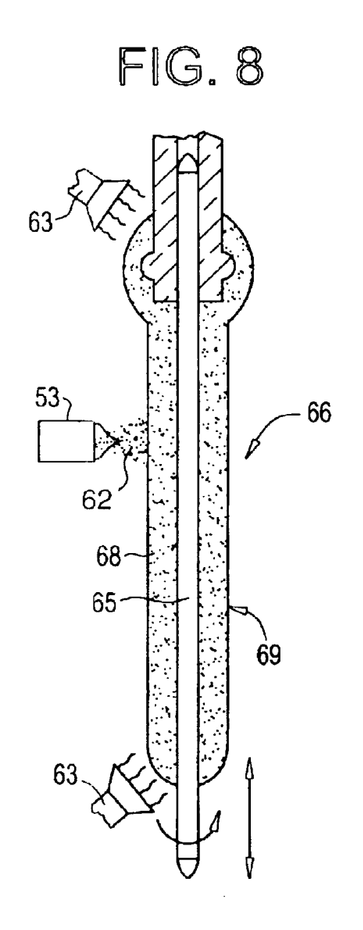
FIG. 8 illustrates a partial cross-sectioned view of a portion of a lathe apparatus for depositing silica-containing soot onto a core cane segment in accordance with the invention.
Figure 9:
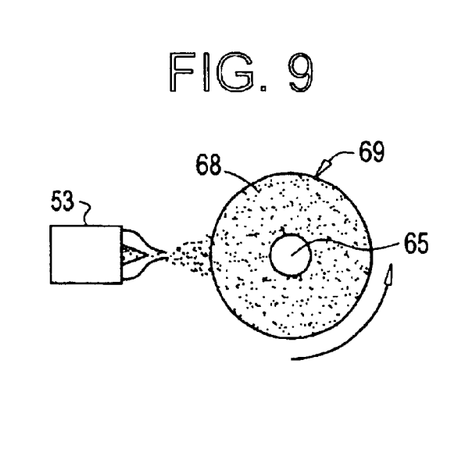
FIG. 9 illustrates an end view of the portion of the apparatus of FIG. 8.

At the next operational step, the core cane 65 is preferably installed in a lathe apparatus 66 as shown in FIGS. 8 and 9 and rotated. The burner 53 preferably makes several passes to ablate the coating prior to starting soot deposition. More preferably, the cane 65 is cleaned prior to ablating the protective layer, preferably by wiping as heretofore described. Additional soot 62 is then deposited onto the cane 65 as indicated in block 37 (FIG. 4) by introducing one or more silica precursors into a flame emanating from a methane burner or burners 53. From the deposited soot, a soot cladding layer 68 is formed. End burners 63 help equalize the stresses at the respective end of the cane 65 and prevent flaking of the soot layer 68 thereat. It should be understood that multiple dopants may be included in the precursors to derive the desired refractive index profile by deposition of core and/or clad soot. In a preferred embodiment which employs the same silane employed in Example 1 above to protect a glass core cane segment 65, the material ablates during deposition of additional core or clad glass soot via an outside vapor deposition process.

Figure 10:
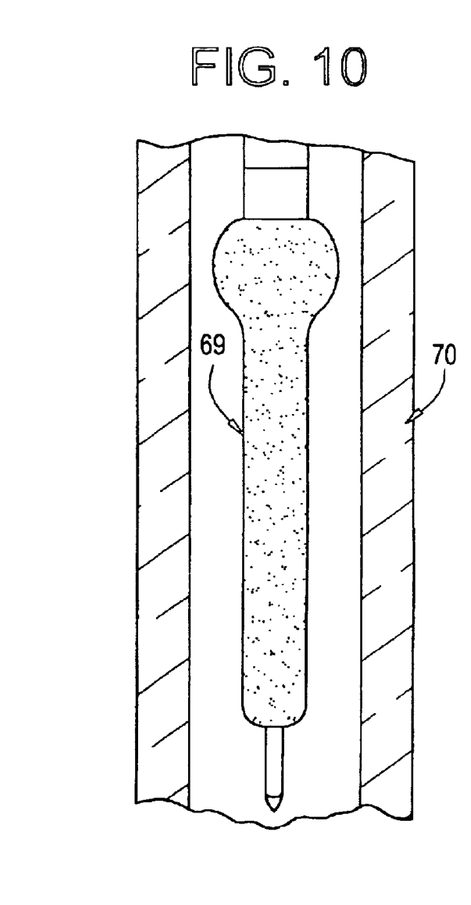
FIG. 10 illustrates a partial cross-sectioned view of a portion of a consolidation furnace apparatus in accordance with the invention.
Figure 11:
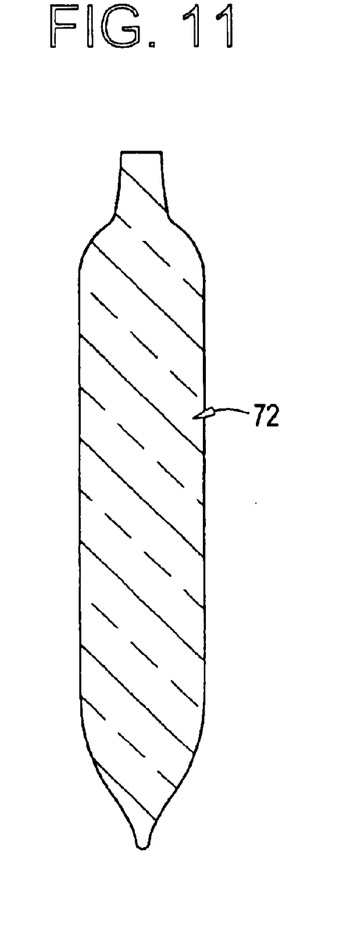
FIG. 11 illustrates a cross-sectioned view of a consolidated preform article in accordance with the invention.

Subsequent to the soot deposition step, the soot preform 69 is placed in a consolidation furnace 70 (FIG. 10), chlorine dried, and consolidated in a helium-containing atmosphere in a conventional manner to form a consolidated optical fiber preform 72 as best illustrated in FIG. 11 and in block 38 of FIG. 4, for example. Again, the preform 72, upon being cooled to at or near room temperature, is preferably coated with the protective layer described herein. If the preform 72 is to be cold transferred to another department, unit or location within a particular factory or to another factory for further processing, the layer will prevent particulate contamination of the surface thereof. Cold transfers of consolidated preforms utilizing the protective layer allow for breakage rates comparable to, or even better than, hot transfers utilized in the prior art.

In a final step as shown in FIG. 12 and block 39 of FIG. 4, the consolidated preform 72 is placed in a draw tower 74 and an optical fiber 76 is drawn therefrom using conventional techniques. The preform 72, held by holding rod 79 is inserted into the hot zone 78 of the furnace having heating coils 80. The lower end of the preform 72 is melted and applying tension (via tractor wheels not shown) allows the fiber 76 to be drawn therefrom. Notably, the layer may be removed as heretofore mentioned, or may be ablated by the heat of the furnace. The fiber is then coated and wound onto a spool, as is conventional practice.

As should be recognized, the protective layer applied to the other silica-containing articles described herein preferably meets the criteria stated above in regard to the protective layer for the fiber preform. Of course, the point in the manufacturing process at which the protective layer ablates or is removed from these silica-containing articles differs.

For example, if a protective layer applied to a silica-containing article other than a fiber preform is intended to ablate, it preferably ablates during further processing of the article. For example, in an outside vapor deposition process, it would be advantageous for a protective layer on a core blank to ablate during drawing of the core blank into a core cane. Likewise, it would be advantageous for a protective layer on a core cane segment to ablate during the deposition of soot thereon.

The protective layers described herein exhibit excellent utility in protecting core cane or other intermediate glass articles before additional glass soot is added to such articles. In such embodiments, the protective layer may be applied onto a glass core cane to protect the core cane until the core cane is to be further processed, for example, within the same factory or at a separate factory. When additional soot material is added onto the core cane, the core cane is preferably first heated to remove the organic protective coating, after which additional glass soot is deposited onto the core cane segment to form a overclad soot blank. This blank may then be consolidated by conventional means to produce a consolidated preform from which optical fiber may be drawn.

In accordance with a preferred embodiment of the invention, a consolidated optical fiber preform 72 (FIG. 11), after being consolidated in a furnace 70 as illustrated in FIG. 10 at a temperature between about 1450° C. to 1600°C., is cooled to at or near room temperature. The preform 72 is wiped cleaned and a protective layer is applied as described herein. The preform 72 may then be temporarily stored in inventory and at room temperature until production requirements dictate movement to the draw furnace to draw fiber therefrom. Optionally, the preform may be shipped to a separate factory for subsequent drawing into fiber. Advantageously, the preform 72 may be wiped clean or the coating removed prior to insertion into the draw furnace. This has the advantageous effect of removing any break inducing particulates. This entire process of cooling the preform to room temperature, and then later further processing (e.g., drawing into fiber) is herein referred to as "cold transfer."

With regard to the inside vapor deposition process, as a further example, it would be advantageous for a protective layer to be applied to the Inner Diameter (ID) and outer surface of the resulting glass tube formed. This is preferably accomplished by swabbing the ID and wiping the OD to form a protective layer thereon. It would be advantageous for the protective layer to ablate during fire polishing or other tube preparatory steps employed just prior to deposition, or just as the first layer of additional soot is being deposited. Likewise, if a protective layer is intended to be removed from a core blank, core cane, or glass tube, it preferably is removed before or during subsequent processing, such as redraw or the deposition of additional soot. It will be apparent that the present invention may be employed on rod-in-tube components and ablated during subsequent processes to fuse the components together.

It will be apparent to those skilled in the art that various modifications and variations can be made in the above-described embodiments of the present invention without departing from the scope or spirit of the invention. It is intended that the specification and examples be considered as exemplary only, with a true scope of the invention being indicated by the following claims.

What is claimed is:

1. A method of manufacture of an optical fiber article, comprising the steps of:
   (a) forming a consolidated silica-containing article at a first factory, the article being useable in the manufacture of optical fiber,
   (b) applying a non-peelable protective layer comprising a silane to the consolidated silica-containing article to form a coated consolidated article, and
   (c) shipping the coated consolidated article to a second factory for further processing.

2. The method of claim 1 wherein the further processing comprises cleaning or washing the protective layer at the second factory.

3. The method of claim 1 wherein the further processing comprises a step of applying additional silica-containing soot to the article to form a soot preform at the second factory.

4. The method of claim 3 comprising the additional steps of:
   (a) consolidating the soot preform at the second factory to form a consolidated optical fiber preform, and
   (b) again applying a protective layer to the consolidated optical fiber preform.

5. The method of claim 3 wherein the further processing comprises a step of substantially completely removing the protective layer before the step of applying additional silica-containing soot to the article.

6. The method of claim 5 wherein the step of substantially completely removing comprises ablating the layer.

7. The method of claim 1 wherein the protective layer comprises an organic material including at least one of hydrocarbon silane, fluorocarbon silane, epoxy functional silane, acrylate functional silane, amine functional silane, thiol functional silane, phenyl functional silane.

8. The method of claim 1 including an additional step of producing an optical fiber from the coated consolidated article at the second factory by placing the glass article comprising a consolidated preform into a draw furnace and drawing optical fiber therefrom.

9. The method of claim 1 wherein the step of forming a consolidated silica containing article comprises forming a core cane segment, the protective layer being applied to the core cane segment.

10. The method of claim 1 wherein the step of forming the consolidated silica-containing article comprises:
   (a) forming a soot blank,
   (b) consolidating the soot blank to form a core blank,
   (c) drawing the core blank to form a core cane segment,
   (d) applying additional silica-containing soot to the core cane segment to form a soot preform, and consolidating the soot preform to form the consolidated silica-containing article comprising a consolidated optical fiber preform, the protective layer being applied to at least one of the core cane segment or the consolidated optical fiber preform.

11. The method of claim 1 further comprising an additional step of, following the steps of applying and shipping, drawing an optical fiber from the consolidated silica-containing article.

12. The method of claim 1 wherein the protective layer has a layer thickness of less than 10 $\mu$m.

13. The method of claim 12 wherein the protective layer has a layer thickness of less than 5 $\mu$m.

14. The method of claim 13 wherein the protective layer has a layer thickness of less than 1 $\mu$m.

15. The method of claim 1, further comprising a step of cleaning the article to remove any particulates from the protective layer following the step of shipping.

16. The method of claim 1, further comprising a step of substantially completely removing the protective layer from the consolidated silica-containing article prior to the further processing.

17. The method of claim 1 wherein the protective layer is ablated during the further processing.

18. The method of claim 1 wherein the consolidated silica-containing article having the protective layer thereon is stored in an inventory system at the second factory.

19. A method of manufacture of optical fiber, comprising the steps of:
   (a) forming a consolidated optical fiber preform at a first factory,
   (b) applying to the preform, at the first factory, a non-peelable protective layer comprising a silane to form a coated consolidated preform,
   (c) shipping the coated consolidated preform to a second factory,
   (d) removing the protective layer by washing or ablating, and
   (e) drawing an optical fiber from the preform at the second factory.

20. A method of manufacture of optical fiber, comprising the steps of:
   forming a consolidated core cane segment at a first factory,
   applying to the consolidated core cane segment, at the first factory, a non-peelable protective layer comprising a silane to form a coated consolidated core cane segment,
   shipping the coated consolidated core cane segment to a second factory,
   substantially completely removing the protective layer,
   depositing soot onto the consolidated core cane segment to form a soot preform at the second factory,
   consolidating the soot preform to form a consolidated preform, and
   drawing an optical fiber from the consolidated preform.

21. A method of manufacture of an optical fiber article, comprising the steps of:
   forming a consolidated silica-containing article at a first factory, the article being useable in the manufacture of optical fiber,
   applying a non-peelable protective layer comprising
      an alkyl ammonium compound,
      an aryl ammonium compound, or
      a wax to the consolidated silica-containing article to form a coated consolidated article, and shipping the coated consolidated article to a second factory for further processing.

22. A method of manufacture of optical fiber, comprising the steps of:
   (a) forming a consolidated optical fiber preform at a first factory,
   (b) applying to the preform, at the first factory, a non-peelable protective layer consisting essentially of a silane and having a thickness less than 10 $\mu$m to form a coated consolidated preform,
   (c) shipping and coated consolidated preform to a second factory,
   (d) removing the non-peelable protective layer by washing or ablating, and
   (e) drawing an optical fiber from the preform at the second factory.

* * * * *